US012803763B2

(12) United States Patent
Yang et al.

(10) Patent No.: US 12,803,763 B2
(45) Date of Patent: Nov. 17, 2026

(54) TRANSMISSION CONFIGURATION INDICATION IN WIRELESS MOBILITY

(71) Applicant: ZTE Corporation, Shenzhen (CN)

(72) Inventors: Ling Yang, Shenzhen (CN); Bo Gao, Shenzhen (CN); Zhaohua Lu, Shenzhen (CN); Shujuan Zhang, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 261 days.

(21) Appl. No.: 18/397,168

(22) Filed: Dec. 27, 2023

(65) Prior Publication Data

US 2024/0250797 A1 Jul. 25, 2024

Related U.S. Application Data

(63) Continuation of application No. PCT/CN2022/122951, filed on Sep. 29, 2022.

(51) Int. Cl.
*H04L 5/00* (2006.01)

(52) U.S. Cl.
CPC .................................. *H04L 5/0094* (2013.01)

(58) Field of Classification Search
CPC ............... H04W 24/04; H04W 72/044; H04W 74/0833; H04W 72/12; H04W 72/1263; H04W 92/18
See application file for complete search history.

(56) References Cited

U.S. PATENT DOCUMENTS

| | | | | |
|---|---|---|---|---|
| 2020/0229161 | A1 | 7/2020 | Raghavan et al. | |
| 2021/0058906 | A1 | 2/2021 | Seo et al. | |
| 2022/0007410 | A1 | 1/2022 | Cirik et al. | |
| 2022/0159772 | A1* | 5/2022 | Raghavan | H04L 5/0044 |
| 2023/0050480 | A1* | 2/2023 | Zhu | H04B 7/0639 |
| 2023/0232390 | A1 | 7/2023 | Li et al. | |
| 2023/0345501 | A1 | 10/2023 | Jin et al. | |
| 2025/0055652 | A1* | 2/2025 | Yang | H04L 5/0053 |

FOREIGN PATENT DOCUMENTS

| | | | |
|---|---|---|---|
| CN | 110959304 | A | 4/2020 |
| CN | 113748618 | A | 12/2021 |
| CN | 114006682 | A | 2/2022 |
| EP | 3897057 | A1 | 10/2021 |
| JP | 2020-535708 | A | 12/2020 |

(Continued)

OTHER PUBLICATIONS

NTT Docomo, Inc, “Remaining issues on multi-beam operation,” 3GPP TSG RAN WG1 #109-e, R1-2204335, e- Meeting, May 9-20, 2022 (13 pages).

(Continued)

*Primary Examiner* — Iqbal Zaidi
(74) *Attorney, Agent, or Firm* — Ashurst Perkins Coie US LLP

(57) ABSTRACT

Methods, system, apparatus for wireless communication are described. One example method includes receiving, by a wireless device from a network device, a first signal indicating one or more transmission configuration indication (TCI) states or TCI state sets; and performing a communication between the wireless device and the network device according to an indicated TCI state.

8 Claims, 14 Drawing Sheets

(56) References Cited

FOREIGN PATENT DOCUMENTS

| | | | |
|---|---|---|---|
| WO | 2021/051085 | A1 | 3/2021 |
| WO | 2022/132631 | A1 | 6/2022 |
| WO | 2022/155198 | A1 | 7/2022 |
| WO | 2022/177281 | A1 | 8/2022 |

OTHER PUBLICATIONS

Qualcomm, Inc., "Enhancements on Multi-beam Operation," 3GPP TSG RAN WG1 Meeting #108-e, R1-2202122, Feb. 21-Mar. 3, 2022 (9 pages).
Qualcomm, Inc., "Enhancements on Multi-beam Operation," 3GPP TSG RAN WG1 Meeting #109-e, R1-2204976, May 9-May 20, 2022 (13 pages).
Moderator (AT&T), "Summary of UE features for further enhancements on NR-MIMO," 3GPP TSG RAN WG1 #108-e, R1-2202850, e-Meeting, Feb. 21-Mar. 3, 2022 (9 pages).
Extended European Search Report for European Patent Application No. 22946039.9, mailed Jan. 31, 2025 (13 pages).
International Search Report and Written Opinion for International Application No. PCT/CN2022/122951, mailed on Apr. 23, 2023 (7 pages).
CATT, "Further discussion on TCI state switching requirements," 3GPP TSG RAN4 #90bis, Xi'an, China, R4-1903226, Apr. 8-12, 2019, 3 pages.
Office Action for Japanese Patent Application No. 2025-518242, mailed Feb. 5, 2026 (5 pages).
Japanese Final Office Action issued in JP Patent Application No. 2025-518242, dated Jul. 21, 2026, 4 pages. English translation included.

* cited by examiner

TRANSMISSION CONFIGURATION INDICATION IN WIRELESS MOBILITY

CROSS REFERENCE TO RELATED APPLICATIONS

This patent document is a continuation of and claims benefit of priority to International Patent Application No. PCT/CN2022/122951, filed on Sep. 29, 2022. The entire content of the before-mentioned patent application is incorporated by reference as part of the disclosure of this application.

TECHNICAL FIELD

This document is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for to allow layer 1/layer 2 (L1/L2) mobility of wireless devices such as user equipment (UE).

In one example aspect, a method of wireless communication is disclosed. The method includes receiving, by a wireless device from a network device, a first signal indicating one or more transmission configuration indication (TCI) states or TCI state sets; and performing a communication between the wireless device and the network device according to an indicated TCI state.

In another example aspect, another method of wireless communication is disclosed. The method includes transmitting, to a wireless device from a network device, a first signal indicating one or more transmission configuration indication (TCI) states or TCI state sets; and performing a communication between the wireless device and the network device according to an indicated TCI state.

In yet another exemplary aspect, the above-described methods are embodied in the form of a computer-readable medium that stores program code. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
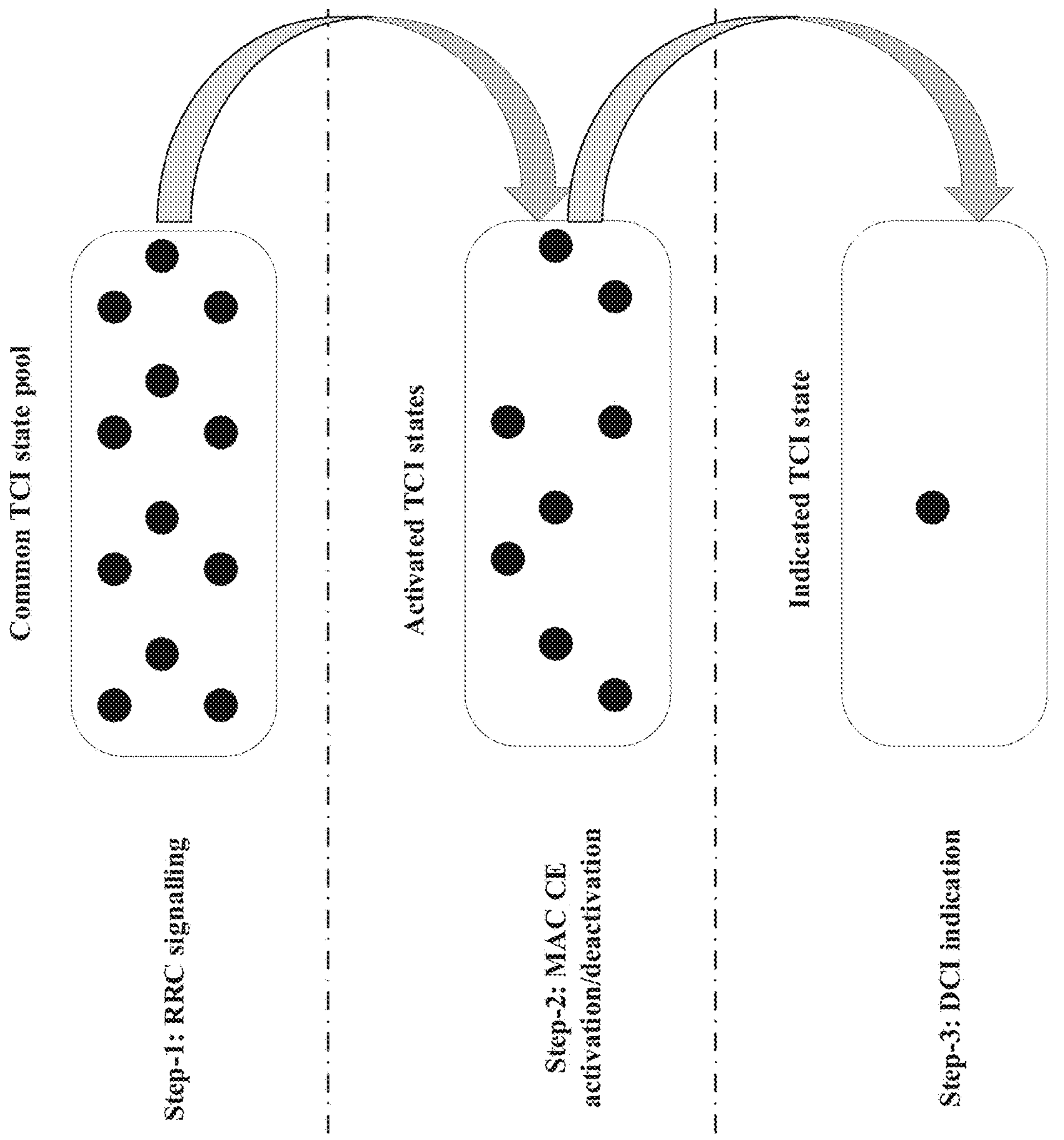
FIG. 1 shows a three-step process of indication of TCI states.

This patent document describes, among other things, application time related techniques for information in L1/L2 mobility enhancements.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

When the UE moves from the coverage area of one cell to another cell, at some point a serving cell change needs to be performed. Currently serving cell change is triggered by L3 measurements and is done by RRC signaling triggered Reconfiguration with Synchronization for change of PCell and PSCell, as well as release add for SCells when applicable. All cases involve complete L2 (and L1) resets, leading to longer latency, larger overhead and longer interruption time than beam switch mobility. The goal of L1/L2 mobility enhancements is to enable a serving cell change via L1/L2 signaling, in order to reduce the latency, overhead and interruption time.

This document discloses, among other things, a method of TCI state indication for L1/L2 mobility.

In RAN Plenary #94 e-meeting, a new work item (WI) on Further NR mobility enhancements was approved. The goal of this discussion is to enable a serving cell change via L1/L2 signaling with low latency, overhead and interruption time. In order to support cell change, some enhancement on TCI state indication need to be considered, such as the procedure of TCI state indication including defining more different TCI state pool/set, association between different TCI state pool and different cell, how to make a distinction between Rel-17 inter-cell mobility without cell change and Rel-18 inter-cell mobility with cell change, some rule for a special case, and so on.

This document discloses, among other things, solutions to the issue mentioned above.

Note 1: In the existing 3GPP specification, TCI state is used to provide a quasi-co-location (QCL) relationship between one or more "reference signals #1" (RS #1) and the "RS #2" or "signal/channel". That is to say, the device can use the QCL relationship of the indicated TCI state to receive or transmit a signal/channel. Wherein,

- QCL type includes one of "QCL-TypeA", "QCL-TypeB", "QCL-TypeC", "QCL-TypeD",
- 'typeA': {Doppler shift, Doppler spread, average delay, delay spread}
- 'typeB': {Doppler shift, Doppler spread}
- 'typeC': {Doppler shift, average delay}
- 'typeD': {Spatial Rx parameter}
- "RS #1" can be at least one of Synchronization Signal and PBCH (physical broadcast channel) block (SS/PBCH block), Channel State Information-Reference Signal (CSI-RS), Sounding Reference Signal (SRS).
- "RS #2" can be at least one of SS/PBCH block, CSI-RS, SRS, Demodulation Reference Signal (DMRS).
- "signal/channel" can be at least one of Physical Downlink Control Channel (PDCCH), Physical Downlink Shared CHannel (PDSCH), Physical Uplink Control Channel (PUCCH), Physical Uplink Shared CHannel (PUSCH), Physical Random Access Channel (PRACH), DMRS, SS/PBCH block, CSI-RS, SRS.

In Rel-17 inter-cell mobility without cell change, for multi-DCI PDSCH transmission, one or more TCI states can be associated with synchronization signal block SSB with a PCI (physical cell identifier) different from the serving cell PCI. The activated TCI states can be associated with at most one PCI different from the serving cell PCI at a time.

In the existing 3GPP specification, a TCI state is indicated by the following three steps, as shown in FIG. 1:

- Step-1: RRC configures a common TCI state set or TCI state Pool, or a TCI state set/Pool;
- Step-2: MAC CE signaling activates a subset of TCI state from TCI state set/pool configured by RRC;
- Step-3: DCI signaling indicates a TCI state from the subset of activated TCI state to UE for reception or transmission signal/channel.

In the above, if MAC CE signaling only activates one TCI state in the above mentioned step-2, then Step-3 can be ignored or omitted.

FIG. 1 depicts an example of a legacy TCI state indication procedure.

In Rel-18 inter-cell mobility with cell change, non-serving cell different from serving cell may not be configured in a similar way as Rel-17 inter-cell mobility without cell change, that is, non-serving cell or additionalPCI is associated with a RS in the TCI state. In Rel-18, candidate cell or non-serving cell can be configured in or for RRCreconfiguration level, or Cellgroupconfig level, or SpCellconfig level, or Scellconfig level. With the above consideration or change, at least one of the following embodiments will provide example methods on how to indicate TCI state.

In various embodiments, the term "cell" can be at least one of serving cell and candidate cell. A candidate cell can be called as target cell or candidate target cell or additional cell or addtionalPCI or non-serving cell or switching cell or candidate switching cell.

In various embodiments, a TCI state pool/set can be a common pool/set for different signal/channel, or different TCI state pool/set can be configured for different signal/channel for a cell. Optionally, a sub-pool/set TCI state for a specific signal/channel can be selected or determined or obtained from a TCI state pool/set.

In some embodiments, the indicated one or more TCI states or sets is from a common TCI state pool or set, or from different TCI state pool or set, or from a common subset of TCI state or set, or from a different subset of TCI state or set. Optionally, a common subset of TCI state or set, or different subset of TCI state or set can be from a common TCI state pool or set, or different TCI state pool or set.

Embodiment 1

Embodiment 1 describes example methods on TCI state indication.

In some embodiment, different TCI state pool/set are configured for or in different cell or cell group. Alternatively, different TCI state pool/set are associated with different cell or cell group. Wherein, TCI state pool/set includes one or more TCI states.

Figure 2:
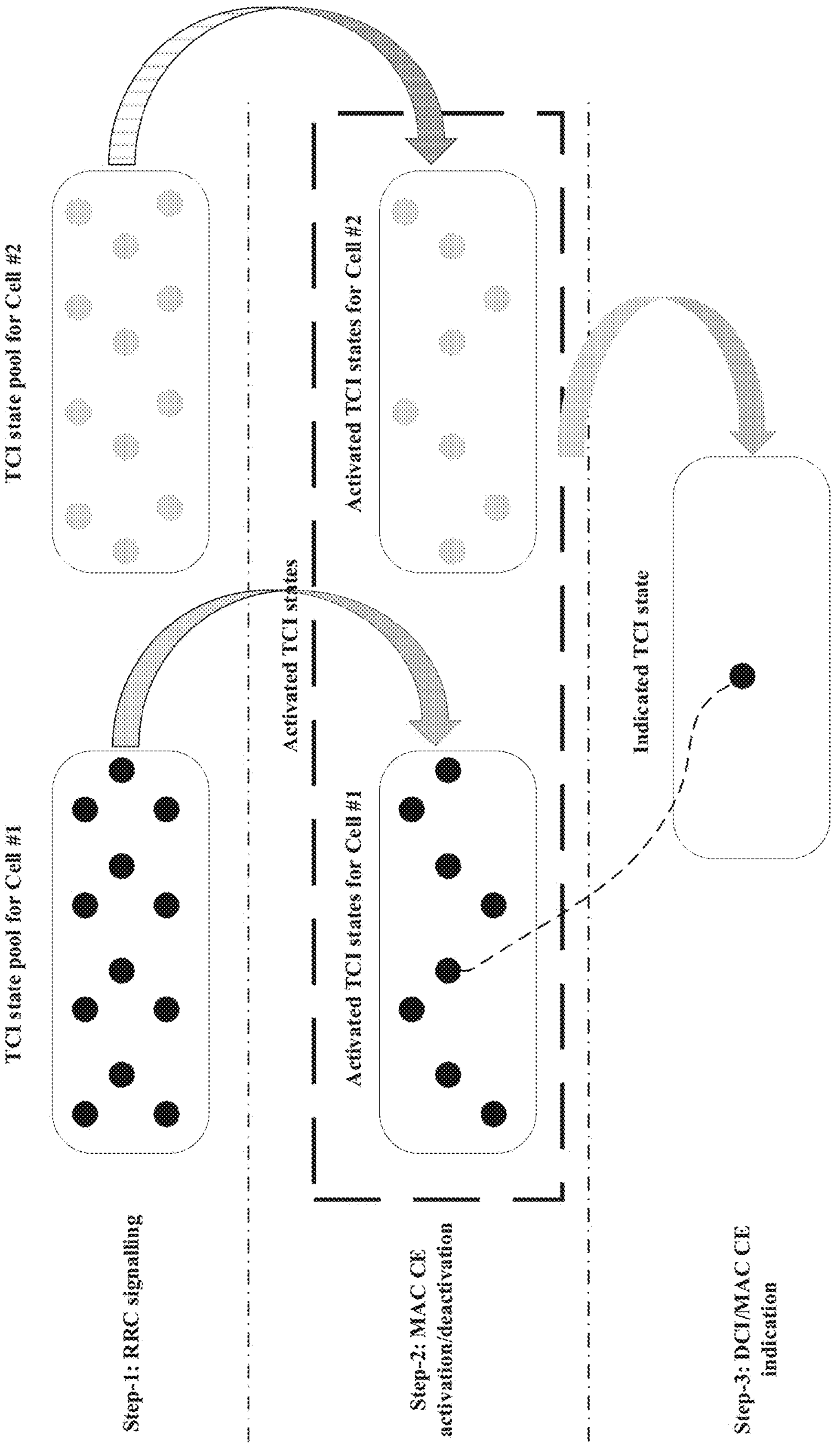
FIG. 2 shows an example in which a medium access control (MAC) control element (CE) activates a TCI state.
Figure 3:
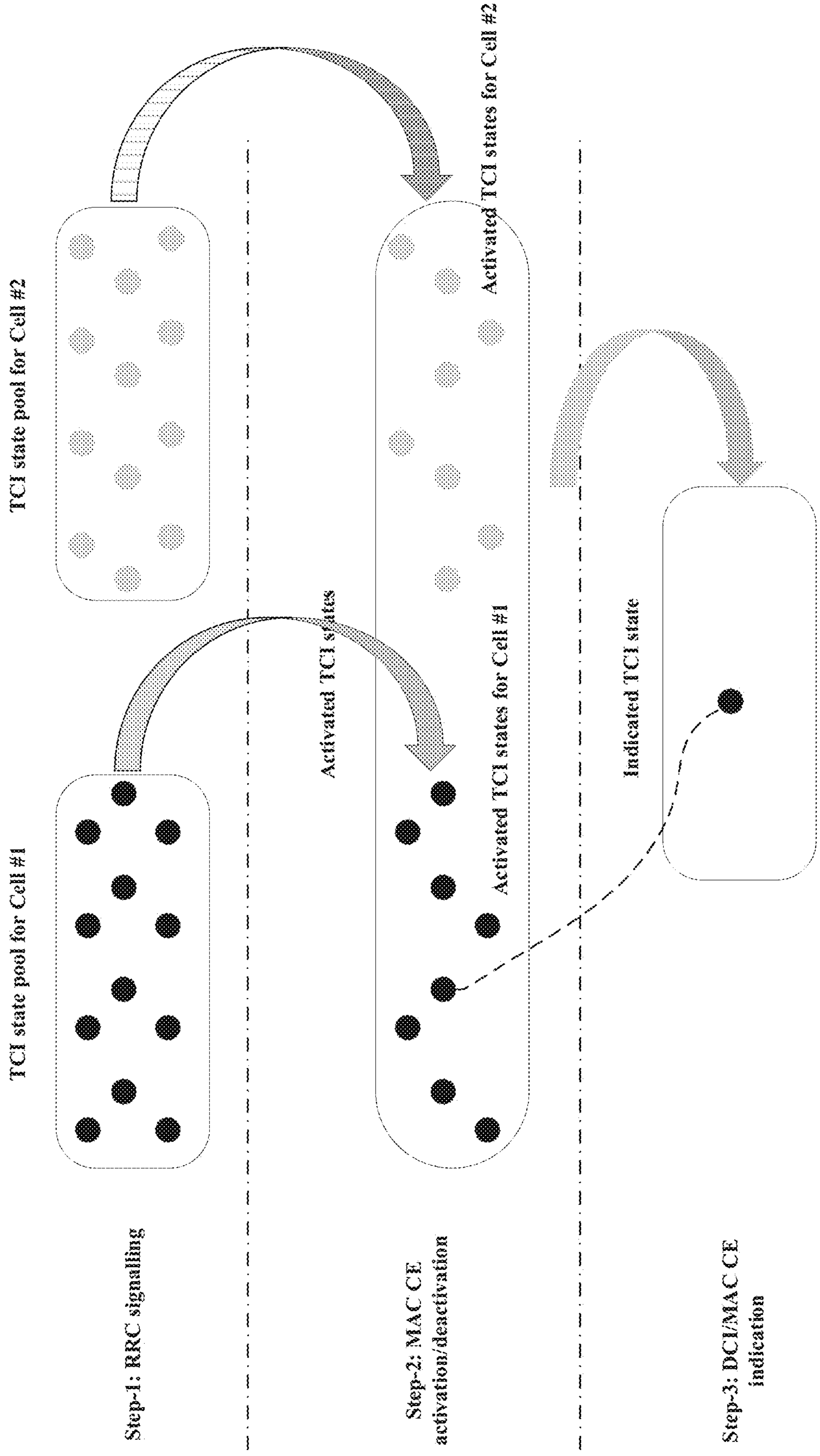
FIG. 3 shows an example in which a MAC CE activates a subset of a TCI state set.

In some embodiment, one or more TCI states are indicated or activated by at least one of the following steps:

- Step-1: RRC configures one or two or more TCI state pool/set. Wherein, each TCI state pool/set is configured for or in a cell or cell group. Wherein, the number of TCI state pool/set or cell or cell group can be configurable or fix or depends on UE capability. In some embodiment, the number of TCI state pool/set can be same as the number of cell or cell group.
- Step-2: MAC CE activates a subset of TCI state. Wherein,
  - Option-1: MAC CE activates each subset of TCI state from each TCI state pool/set. As shown in FIG. 2. In some embodiment, the number of each activated TCI state can be the same or different for different cell or cell group.
  - Option-2: MAC CE activates a subset of TCI state from one or more different TCI state pool/set. As shown in FIG. 3

In some embodiment, the number of the activated TCI state can be fixed or variable or depends on UE capability. Preferably, the number of the activated TCI state can be an integer, such as 1, 2, 3, 4, 5, 6, 7, 8, 9, 10, 11, 12, 13, 14, 15, 16, etc.

- Step-3: A signaling indicates one or more TCI states. In various embodiments, a signaling can be MAC CE signaling or DCI signaling. In some embodiment, if the number of the activated TCI state is larger than or equal to an offset, then a signaling can be used to indicate one or more TCI state from the activated TCI states. If the number of the activated TCI state is less than or equal to an offset, then a signaling or this step used to indicate one or more TCI states can be ignored or omitted.

In an example, as shown in FIG. 2, the number of the activated TCI state for a cell is larger than or equal to an offset, then a signaling such as MAC CE or DCI can be used to indicate one TCI state from the activated TCI states corresponding to or associated with a cell.

In another example, as shown in FIG. 3, the number of the activated TCI state from same or different cells is larger than or equal to an offset, then a signaling such as MAC CE or DCI can be used to indicate one TCI state from the activated TCI states.

Figure 4:
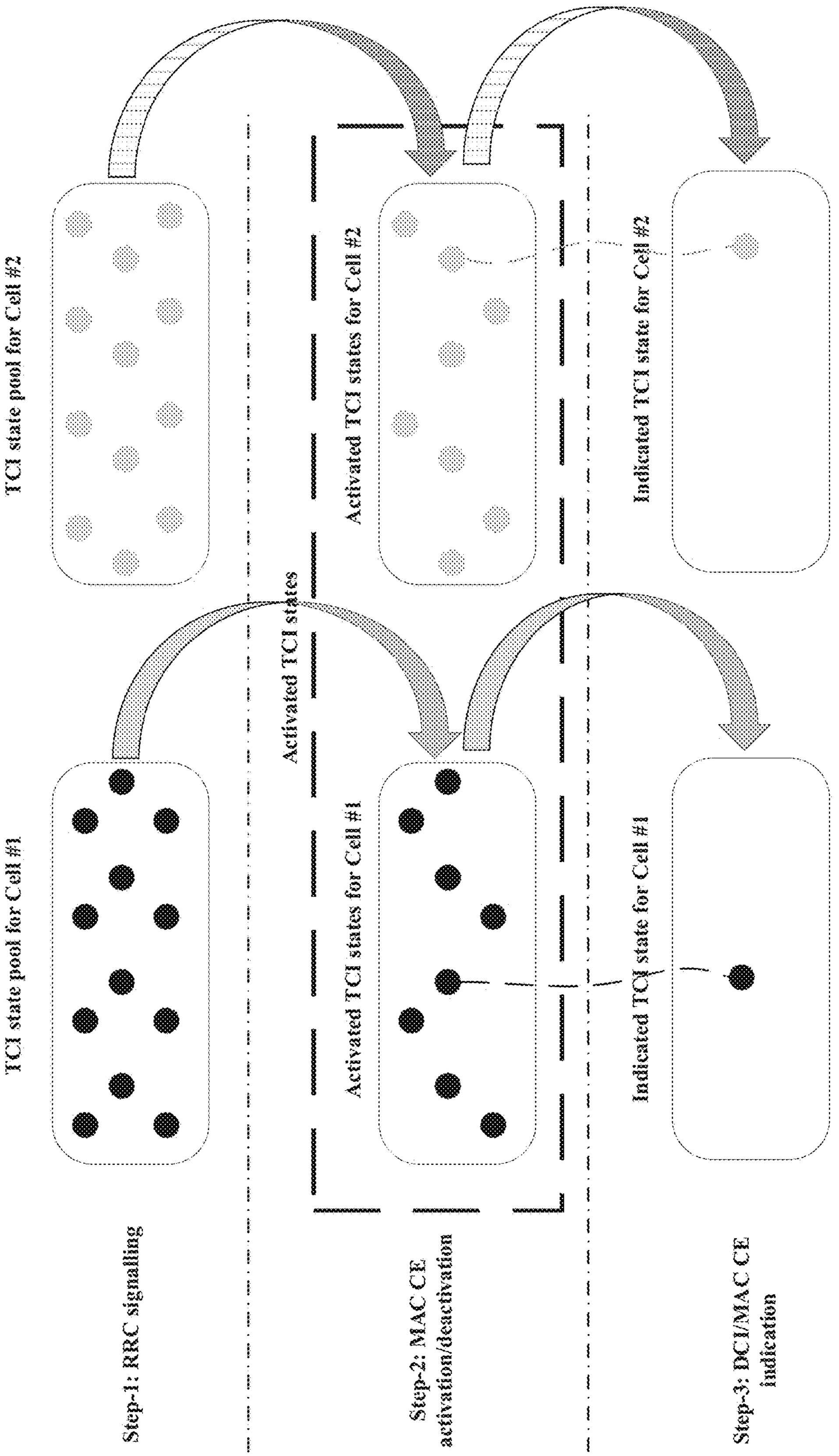
FIG. 4 shows an example configuration in which the number of activated TCI states is greater than an offset.

In another example, as shown in FIG. 4, the number of the activated TCI state from same or different cells is larger than or equal to an offset, then a signaling such as MAC CE or DCI can be used to indicate one TCI state from each activated TCI states.

Embodiment 2

Embodiment 2 describes example methods of TCI state indication.

In some embodiment, different TCI state pool/set are configured for or in different cell or cell group. Alternatively, different TCI state pool/set are associated with different cell or cell group. Wherein, TCI state pool/set includes one or more TCI states.

Figure 5:
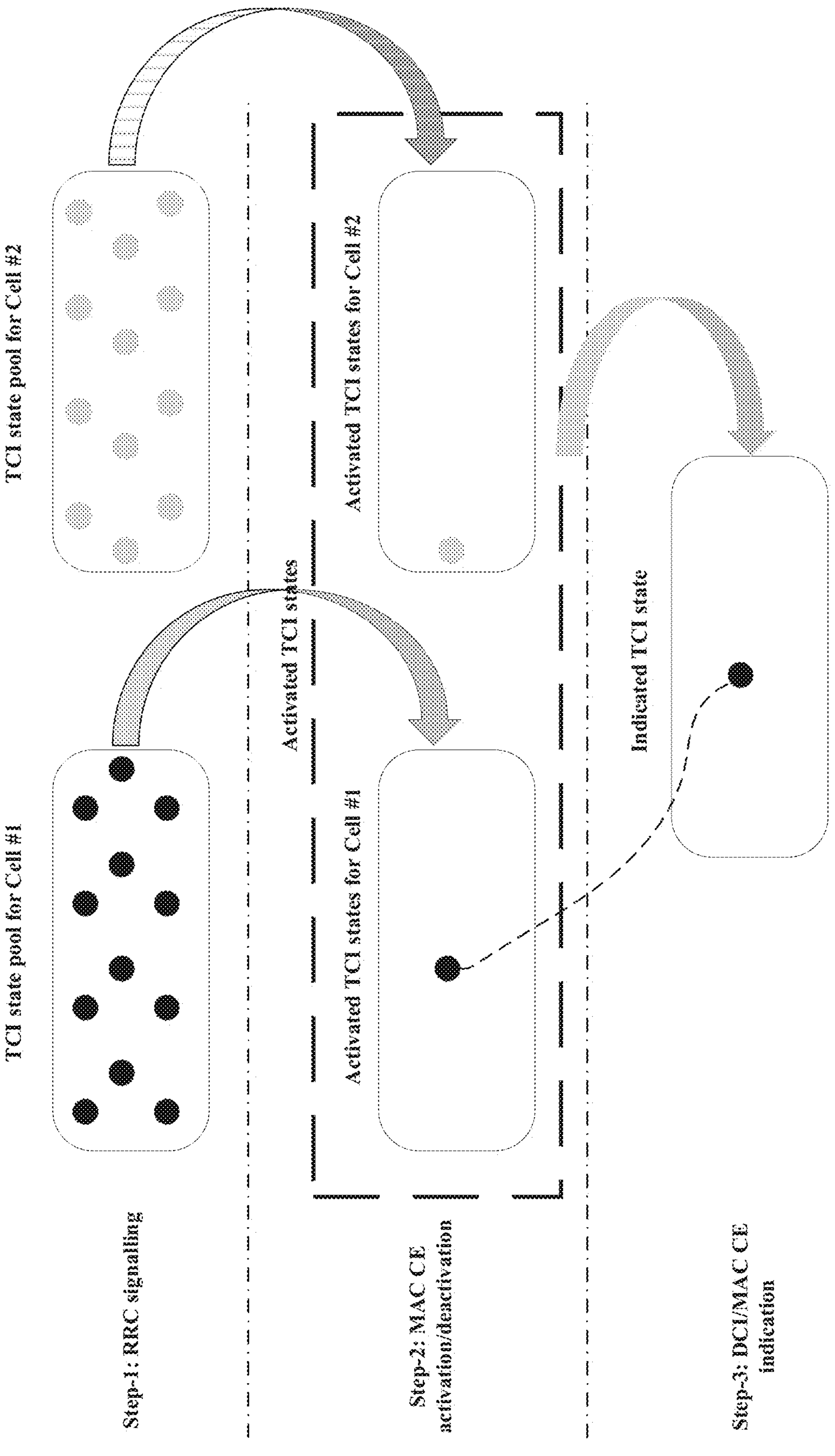
FIG. 5 shows an example configuration in which a MAC CE activates one TCI state from each TCI pool.
Figure 6:
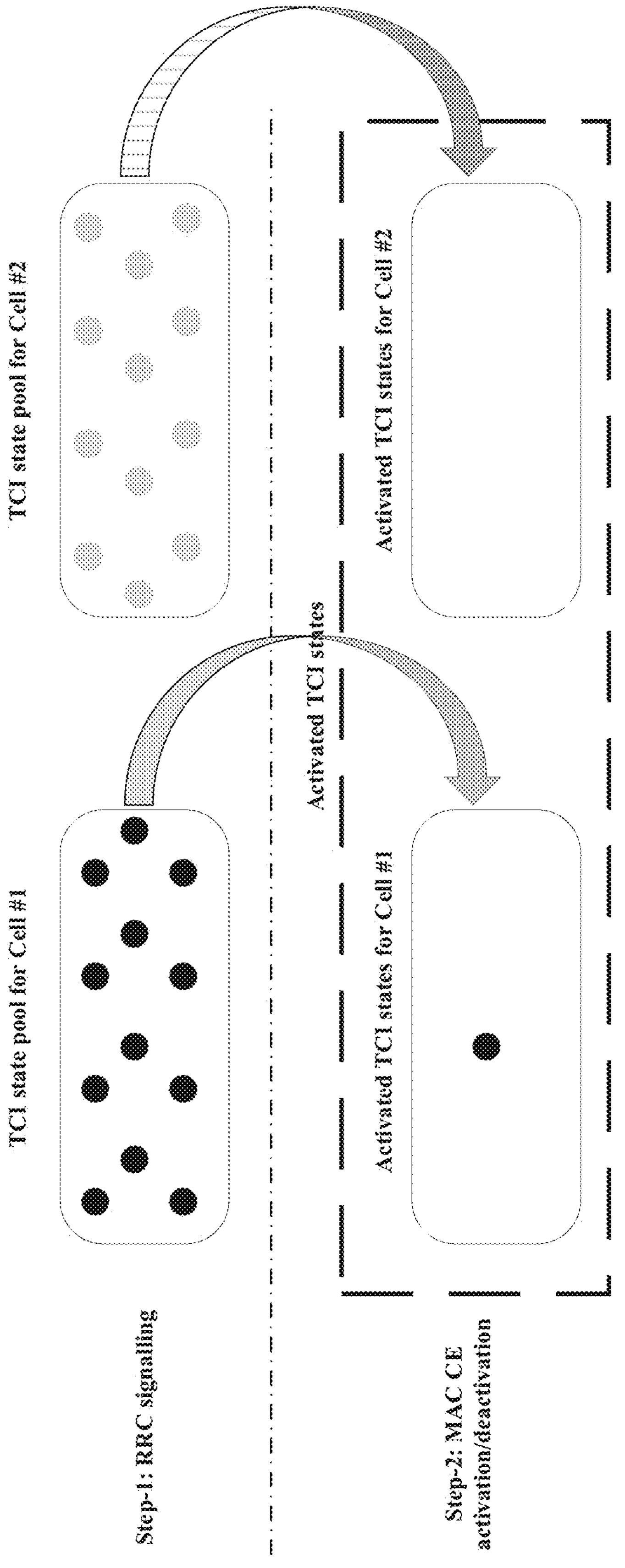
FIG. 6 shows an example configuration in which a MAC CE activates one TCI state from different TCI state pools.

In some embodiment, one or more TCI states are indicated or activated by at least one of the following steps:

- Step-1: RRC configures one or two or more TCI state pool/set. Wherein, each TCI state pool/set is configured for or in a cell or cell group. Wherein, the number of TCI state pool/set or cell or cell group can be configurable or fix or depends on UE capability. In some embodiment, the number of TCI state pool/set can be same as the number of cell or cell group.
- Step-2: MAC CE activates one TCI state. Wherein,
  - Option-1: MAC CE activates one TCI state from each TCI state pool/set. As shown in FIG. 5. In some embodiment, none of TCI state is activated from a TCI state pool/set. In some embodiment, the number of each activated TCI state can be the same or different for different cell or cell group.
  - Option-2: MAC CE activates one TCI state from one or more different TCI state pool/set. As shown in FIG. 6.
- Step-3: A signaling indicates one or more TCI states. In some embodiments, a signaling can be MAC CE signaling or DCI signaling. If the number of the activated TCI state is larger than or equal to an offset, then a signaling can be used to indicate one or more TCI state from the activated TCI states. If the number of the activated TCI state is less than or equal to an offset, then a signaling or this step used to indicate one or more TCI states can be ignored or omitted.

In one example, as shown in FIG. 5, the number of the activated TCI state is larger than or equal to an offset, then a signaling can be used to indicate one TCI state from the activated TCI states.

In one example, as shown in FIG. 6, the number of the activated TCI state is less than or equal to an offset, then a signaling or the above-mentioned step-3 used to indicate one TCI state can be ignored or omitted.

Embodiment 3

Embodiment 3 describes example methods on TCI state indication.

In some embodiment, different TCI state pool/set are configured for or in different cell or cell group. In some embodiments, different TCI state pool/set are associated with different cell or cell group. In some embodiments, TCI state pool/set includes one or more TCI states.

In some embodiment, one or more TCI states are indicated or activated by at least one of the following steps:

- Step-1: RRC configures one or two or more cell in a cell pool/set. In some embodiment, each cell can include or be configured a corresponding TCI state pool/set, or each cell can be associated with a TCI state pool/set. In some embodiment, the number of TCI state for each TCI state pool/set can be same or different. In some embodiment, TCI state for each TCI state pool/set can be from a common TCI state pool/set.
- Step-2: MAC CE activates one or more Cells for the configured cell pool/set and/or the corresponding one or more TCI states.

In some embodiment, when MAC CE activates a cell from cell pool/set, one or more TCI states associated with or corresponding to the cell is activated simultaneously. As shown in FIG. 7, FIG. 8, FIG. 9, FIG. 10.

In some embodiment, the activated TCI state can consist of one or more TCI state from different TCI state pool/set. In some embodiment, the activated TCI state can consist of different sub-set/pool of TCI state from different TCI state pool/set.

- Step-3: A signaling indicates one or more cell and/or the corresponding one or more TCI states. Wherein, the signaling can be DCI signaling or MAC CE signaling.

In some embodiment, if the number of the activated cell and/or the number of the activated TCI state is larger than or equal to an offset, then a signaling can be used to indicated one or more cells and/or the corresponding one or more TCI state from the activated TCI states. If the number of the activated cell and/or the number of the activated TCI state is less than or equal to an offset, then a signaling or this step used to indicate one or more cells and/or the corresponding one or more TCI state can be ignored or omitted.

Figure 7:
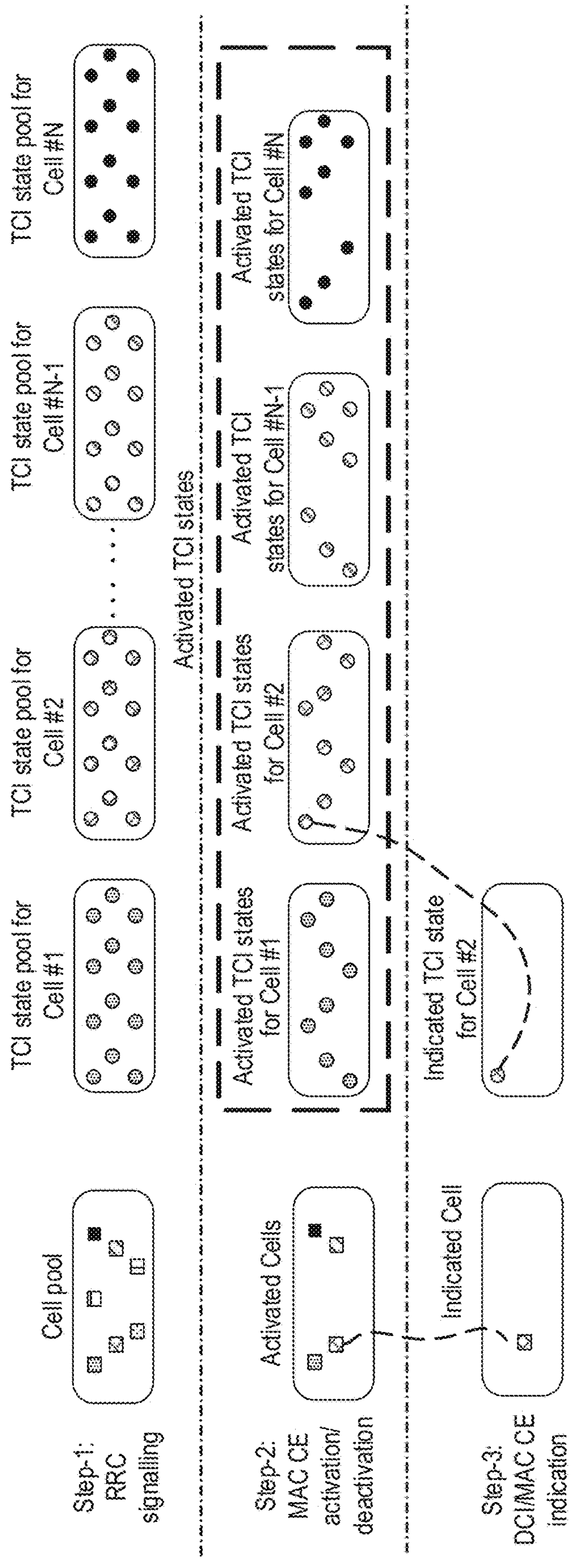
FIG. 7 shows one example when a MAC CE activates a cell from a cell pool/set, and one or more TCI states associated with or corresponding to the cell are activated simultaneously.

In one example, as shown in FIG. 7, the number of the activated cell and/or the number of the activated TCI state is larger than or equal to an offset, then DCI signaling or MAC CE signaling can be used to indicate one cell and corresponding to TCI state.

Figure 8:
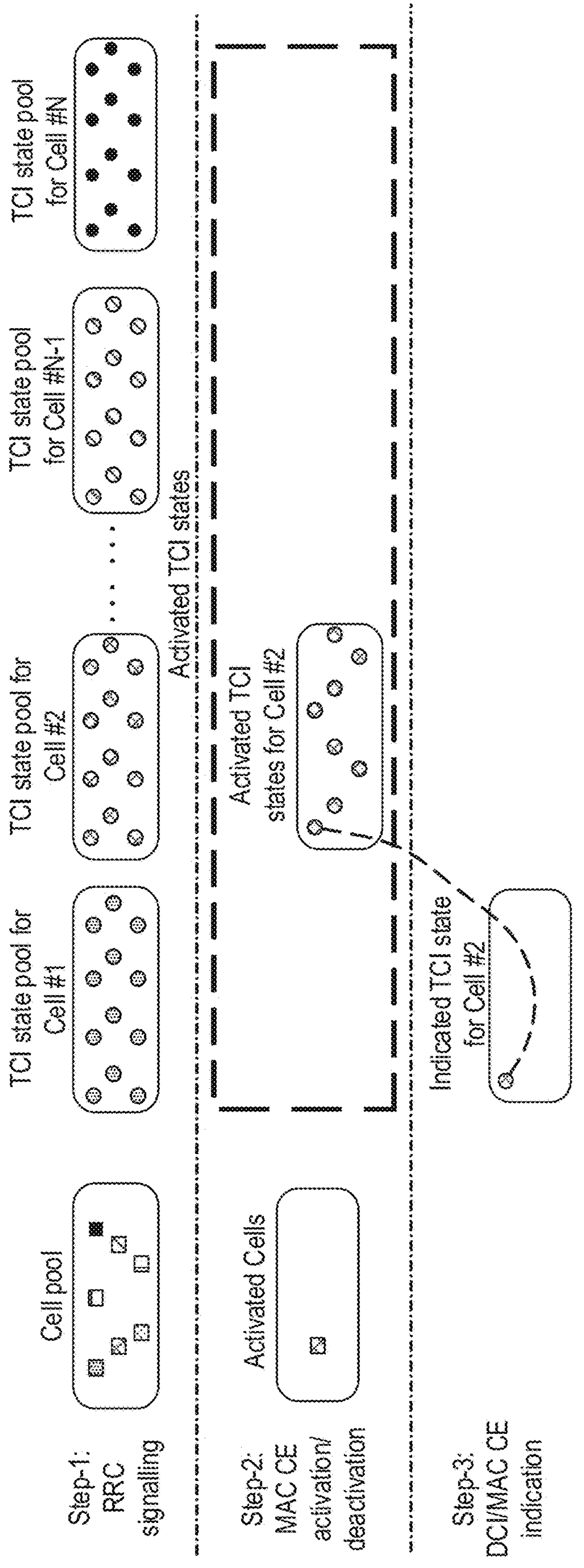
FIG. 8 shows another example of activation TCI states.
Figure 9:
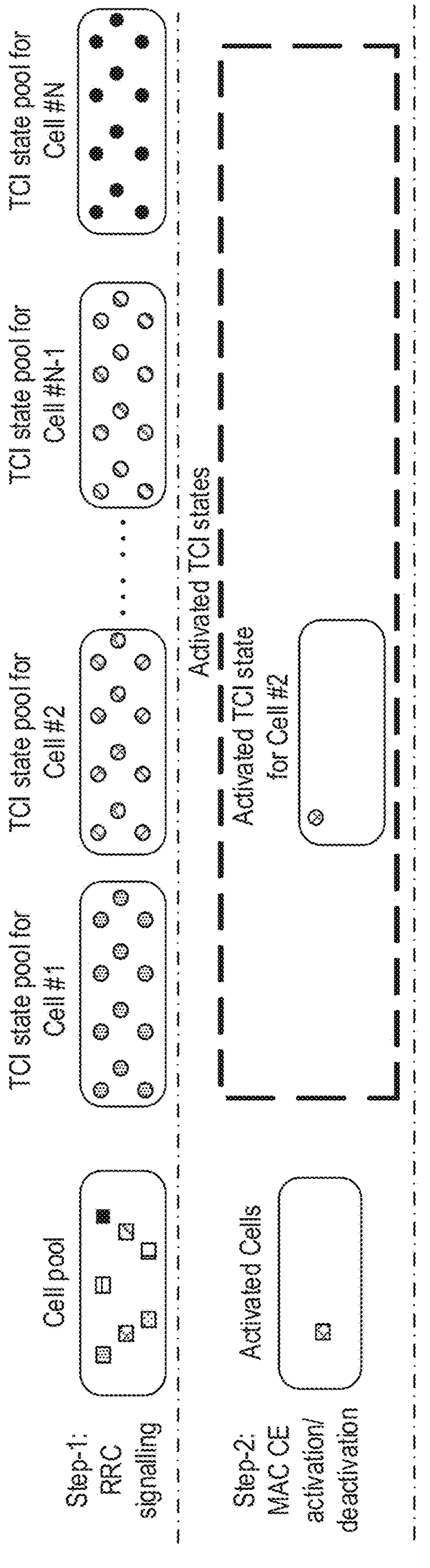
FIG. 9 shows another example of activation TCI states.

In one example, as shown in FIG. 8, the number of the activated cell is less than or equal to an offset, but the number of the activated TCI state is larger than or equal to an offset, then DCI signaling or MAC CE signaling can be used to indicate one TCI state for the cell In one example, as shown in FIG. 9, the number of the activated cell and the number of the activated TCI state is less than or equal to an offset, then using MAC CE signaling or DCI signaling or the above-mentioned step-3 used to indicate one or more cells and/or the corresponding one or more TCI state can be ignored or omitted.

Figure 10:
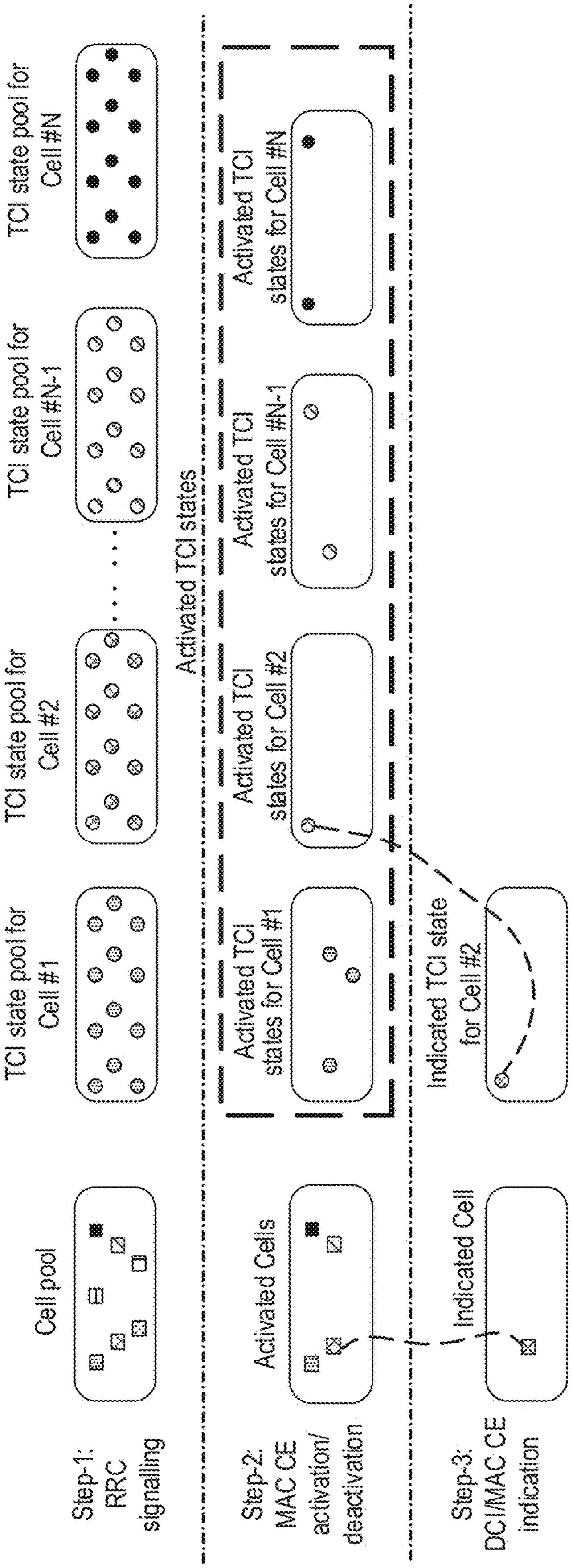
FIG. 10 shows another example of activation TCI states.

In one example, as shown in FIG. 10, the number of the activated cell and/or the number of the activated TCI state from different cells is larger than or equal to an offset, then DCI signaling or MAC CE signaling can be used to indicate one cell and corresponding to TCI state.

Embodiment 4

Embodiment 3 describes example methods to indicate or define or determine additional TCI state for the indicated cell or cell group. That is to say, the additional TCI state is associated with the indicated cell or cell group information.

For at least one of the following cases, additional TCI state can be indicated or defined or determined:

- The indicated TCI state does not effective or cannot be applied;
- Cell or cell group is updated or can be unavailable or changes;
- The indicated TCI state is not applicable or has changed;

The related information for the cell or cell group has not been prepared yet;

Some possible usages also belong to the scope of this disclosure.

In some embodiment, additional TCI state can be determined by a reserved ID or a special field or a special value/entry (such as all '0', or all '1', or etc.) in a field. In some embodiment, additional TCI state can be associated with the indicated TCI state by a signaling or additional TCI state can be associated with the TCI state of the indicated cell or cell group.

In some embodiment, the indicated TCI state can be applied until the MAC CE or DCI CE is to activate a TCI pool/set for the indicated cell or cell group. In some embodiment, the indicated TCI state can be applied based on the special beam application time rule.

Embodiment 5

Embodiment 5 describes example methods on how to distinguish Rel-17 ICBM and Rel-18 inter-cell mobility.

Explicitly method

Alternative-1: Introduce a new field on "cell/cell group identification/index" in a signaling. Wherein, the signaling can be MAC CE signaling or DCI signaling. In some embodiment, if this field is set to 0, it represents that the current operation is under Rel-17 Inter-cell mobility without cell change. If this field is set as the value other than 0, it represents that the current operation is under Rel-18 Inter-cell mobility with cell change. Further, how to indicate one or more cell to be switched to can consider one of the following scheme:

Scheme-1: bitmap method. In some embodiment, each bit in the bitmap can be used to indicate a cell.

Scheme-2: the value corresponding to this field can be indicated cell information or index.

Alternative-2: Introduce a new field on "an identification on Rel-17 Inter-cell mobility without cell change or Rel-18 Inter-cell mobility with cell change" in a signaling. In some embodiment, only one bit can be used to distinguish the current operation is under Rel-17 Inter-cell mobility without cell change or Rel-18 Inter-cell mobility with cell change. For example, if this field is set to 0/1, it represents that the current operation is under Rel-17 Inter-cell mobility without cell change/Rel-18 Inter-cell mobility with cell change. If this field is set to I/O, it represents that the current operation is under Rel-18 Inter-cell mobility with cell change/Rel-17 Inter-cell mobility without cell change.

Implicit indication method

Rel-17 Inter-cell mobility without cell change or Rel-18 Inter-cell mobility with cell change can be distinguished using different field setting. In some embodiment, we can use different hybrid automatic repeat request HARQ process number to make a distinction between Rel-17 Inter-cell mobility without cell change and Rel-18 Inter-cell mobility with cell change. In one example, the following field setting can be used for Rel-18 inter-cell mobility with cell change:

Redundant version (RV): set to all '1's;

Modulation and coding scheme (MCS): set to all '1's;

New date indication (NDI): Set to '0';

HARQ process number: Set to all '1's/Set to all '0's;

Frequency domain resource allocation (FDRA): Set to all '0's for FDRA Type 0; Set to all '1's for FDRA Type 1; Set to all '0's for dynamicSwitch.

In one example, the following field setting can be used for TCI state indication without DL assignment in a DCI signaling:

Redundant version (RV): set to all '1's;

Modulation and coding scheme (MCS): set to all '1's;

New date indication (NDI): Set to '0';

HARQ process number: Set to all '0's/Set to all '1's;

Frequency domain resource allocation (FDRA): Set to all '0's for FDRA Type 0; Set to all '1's for FDRA Type 1; Set to all '0's for dynamicSwitch.

In some embodiment, Redundant version (RV) can be set as all '0's. NDI can be set as '0'.

In some embodiment, different setting for different fields can be used to achieve different usages.

Example Systems and Apparatus

Figure 13:
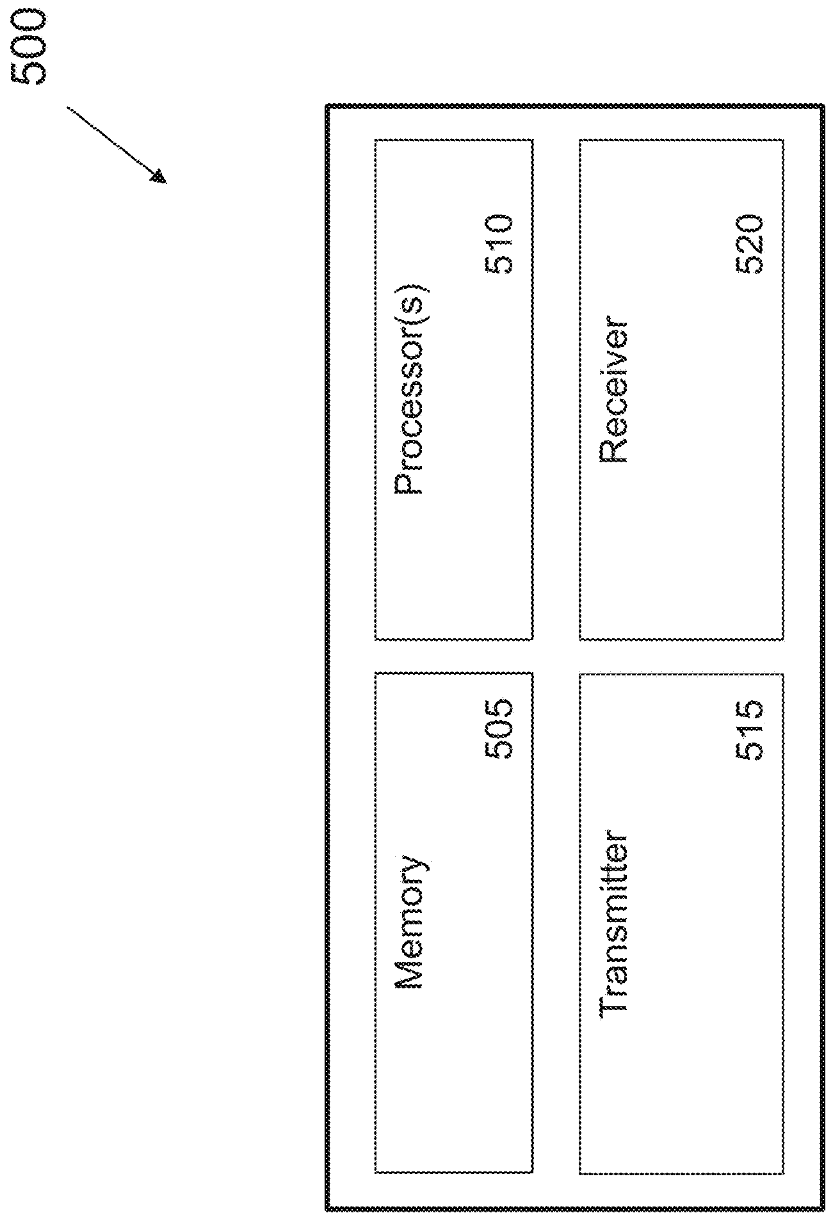
FIG. 13 shows an exemplary block diagram of a hardware platform that may be a part of a network device or a communication device.

FIG. 13 shows an exemplary block diagram of a hardware platform 500 that may be a part of a network device (e.g., base station) or a wireless device (e.g., a user equipment (UE)). The hardware platform 500 includes at least one processor 510 and a memory 505 having instructions stored thereupon. The instructions upon execution by the processor 510 configure the hardware platform 500 to perform the operations described in the various flowcharts, and in the various embodiments described in this patent document. The transmitter 515 transmits or sends information or data to another device. For example, a network device transmitter can send a message to a user equipment. The receiver 520 receives information or data transmitted or sent by another device. For example, a user equipment can receive a message from a network device.

Figure 14:
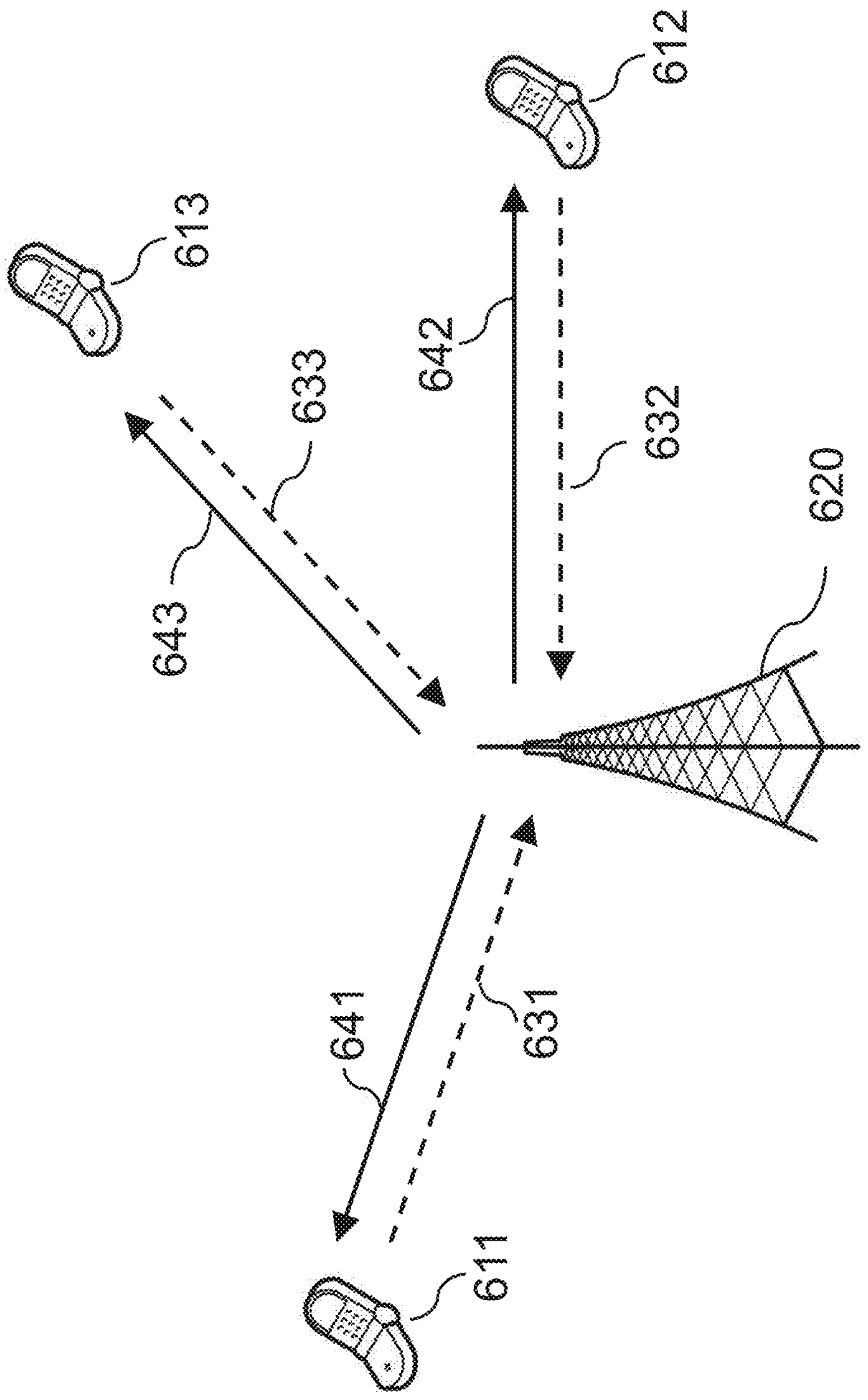
FIG. 14 shows an example of wireless communication including a base station (BS) and user equipment (UE) based on some implementations of the disclosed technology.

The implementations as discussed above will apply to a wireless communication. FIG. 14 shows an example of a wireless communication system (e.g., a 5G or NR cellular network) that includes a base station 620 and one or more wireless devices or user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IOT) device, and so on.

The following technical solutions may be adopted by some preferred embodiments.

Figure 11:
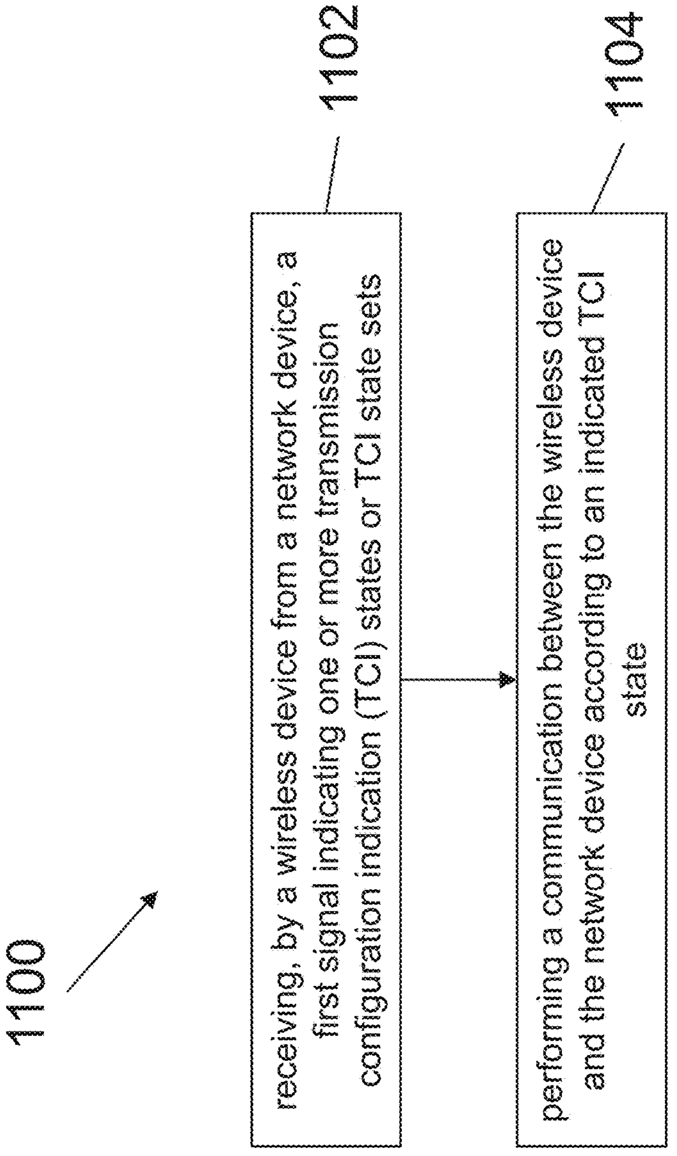
FIG. 11 shows an exemplary flowchart for wireless communication.

1. A method of wireless communication (e.g., method 1100 depicted in FIG. 11), comprising: receiving (1102), by a wireless device from a network device, a first signal indicating one or more transmission configuration indication (TCI) states or TCI state sets; and performing (1104) a communication between the wireless device and the network device according to an indicated TCI state.

Figure 12:
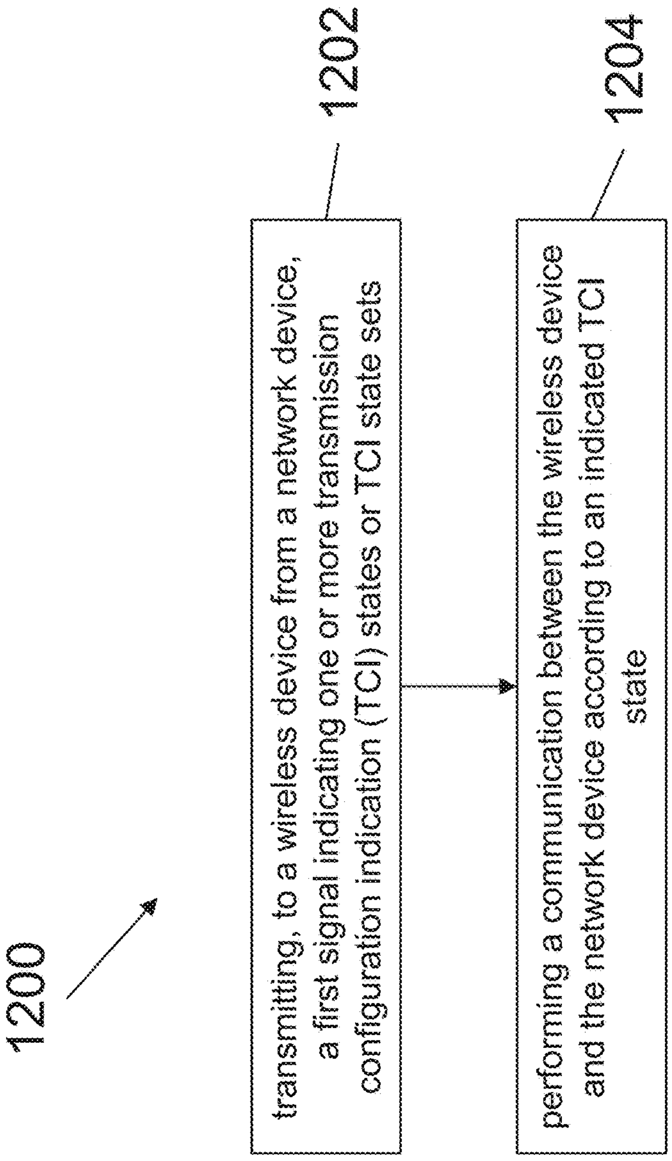
FIG. 12 shows an exemplary flowchart for wireless communication.

2. A method of wireless communication (e.g., method 1200 depicted in FIG. 12), comprising: transmitting (1202), to a wireless device from a network device, a first signal indicating one or more transmission configuration indication (TCI) states or TCI state sets; and performing (1204) a communication between the wireless device and the network device according to an indicated TCI state.

Additional features of the above-listed methods are disclosed with reference to embodiments 1 to 5.

Here, the communication between the wireless device and the network device may occur over a communication channel and may include receiving signals from or transmitting signals to the other end of a communication channel.

Various examples of the above-described methods are further described with reference to Embodiments 1 to 5.

3. The method of solution 1 or 2, wherein, one or more of following relationships are true in case that the first signal indicates one or more TCI state sets:

one TCI state set is associated with or from a cell or a group of cells;

multiple TCI state sets are associated with or from a cell or a group of cells;

each TCI state set is associated with or from a cell or a group of cells;

different TCI state sets are associated with or from different cells or groups of cells;

one TCI state set is associated with or from different cells or groups of cells;

one TCI state set is associated with or from a subset of a TCI state set;

one TCI state set is associated with or from a set of a TCI state set;

multiple TCI state sets are associated with or from a subset of a TCI state set;

multiple TCI state sets are associated with or from a set of a TCI state set;

each TCI state set is associated with or from a subset of a TCI state set;

each TCI state set is associated with or from a set of a TCI state set;

one TCI state set is associated with or from different subsets of a TCI state set;

one TCI state set is associated with or from different sets of a TCI state set;

one TCI state set is associated with or from different subsets of different TCI state sets;

one TCI state set is associated with or from different sets of different TCI state sets;

different TCI state sets are associated with or from different subsets of different TCI state sets;

different TCI state sets are associated with or from different sets of different TCI state sets;

different TCI state sets are associated with or from different sets of a TCI state set; or different TCI state sets are associated with or from different subsets of a TCI state set.

4. The method of solution 1 or 2, wherein, one or more of following relationships are true in case that the first signaling indicate one or more TCI state:

one TCI state is associated with or from a cell or a group of cells;

multiple TCI states are associated with or from a cell or a group of cells;

each TCI state is associated with or from a cell or a group of cells;

different TCI states are associated with or from different cells or groups of cells;

one TCI state is associated with or from different cells or groups of cells;

one TCI state is associated with or from a subset of a TCI state set;

one TCI state is associated with or from a set of a TCI state set;

one TCI state is associated with or from a subset of a TCI state;

one TCI state is associated with or from a set of a TCI state;

multiple TCI states are associated with or from a subset of a TCI state set;

multiple TCI states are associated with or from a set of a TCI state set;

multiple TCI states are associated with or from a subset of a TCI state;

multiple TCI states are associated with or from a set of a TCI state;

each TCI state is associated with or from a subset of a TCI state set;

each TCI state is associated with or from a set of a TCI state set;

each TCI state is associated with or from a subset of a TCI state;

each TCI state is associated with or from a set of a TCI state;

one TCI state is associated with or from different subsets of a TCI state set;

one TCI state is associated with or from different sets of a TCI state set;

one TCI state is associated with or from different subsets of a TCI state;

one TCI state is associated with or from different sets of a TCI state;

one TCI state is associated with or from different subsets of different TCI state sets;

one TCI state is associated with or from different sets of TCI state sets;

one TCI state is associated with or from different subsets of TCI state;

one TCI state is associated with or from different sets of TCI state;

different TCI state are associated with or from different subsets of different TCI state sets;

different TCI state are associated with or from different sets of TCI state sets;

different TCI state are associated with or from different subsets of TCI state;

different TCI state are associated with or from different sets of TCI state;

different TCI states are associated with or from different sets of a TCI state set;

different TCI states are associated with or from different subsets of a TCI state;

different TCI states are associated with or from different sets of a TCI state; or different TCI states are associated with or from different subsets of a TCI state set.

5. The method of solution 3 or 4, wherein, the relationships further include:

different subsets of a TCI state set are associated with or from a common TCI state pool;

different sets of a TCI state set are associated with or from a common TCI state pool;

different subsets of a TCI state set are associated with or from different TCI state pool;

different sets of a TCI state set are associated with or from different TCI state pool;

different subsets of TCI state are associated with or from a common TCI state pool;

different sets of TCI state are associated with or from a common TCI state pool;

different subsets of TCI state are associated with or from different TCI state pool;

different sets of TCI state are associated with or from different TCI state pool;

a subset of a TCI state is associated with or from a common TCI state pool;

a set of a TCI state is associated with or from a common TCI state pool;

a subset of TCI state set is associated with or from different TCI state pool;

a set of TCI state set is associated with or from different TCI state pool;

different TCI state are associated with or from a common TCI state pool;

different TCI state are associated with or from different TCI state pool;

different TCI state set are associated with or from a common TCI state pool;

different TCI state set are associated with or from different TCI state pool.

6. The method of solution 5, wherein the relationships include one or more of the following:

a common TCI state pool is associated with or configured for all cells or groups of cells;

a common TCI state pool is associated with or configured for a cell or a group of cells;

different TCI state pools are associated with or configured for different cells of the groups of cells;

different TCI state pool are associated with or configured for a cell or a group of cells;

each TCI state pool is associated with or configured for a cell or a group of cells.

7. The method of solution 1, 2 or 4, wherein, one or more of following relationships are true in case that the first signal indicates one or more TCI states:

the indicated one TCI state is mapped to one TCI state from a subset of TCI states;

the indicated one TCI state is mapped to one TCI state from a set of TCI states;

the indicated multiple TCI states are mapped to more TCI states from a subset of TCI state;

the indicated multiple TCI states are mapped to more TCI states from a set of TCI state;

the indicated multiple TCI states are mapped to more TCI states from different subsets of TCI states;

the indicated multiple TCI states are mapped to more TCI states from different sets of TCI states;

one of the indicated more TCI states is mapped to one TCI state from a subset of TCI states;

one of the indicated more TCI states is mapped to one TCI state from a set of TCI states;

each one of the indicated more TCI states is mapped to one TCI state from different subset of TCI states;

each one of the indicated more TCI states is mapped to one TCI state from different set of TCI states.

8. The method of solution 1 or 2, wherein in case that the first signal indicates one or more TCI state sets, the relationships include one or more of the following:

the indicated one or more TCI state sets are mapped to one or more TCI state sets from a subsets of one or more TCI state set;

the indicated one or more TCI state sets are mapped to one or more TCI state sets from a sets of one or more TCI state set;

the indicated one TCI state set is mapped to one TCI state set from a subset of a TCI state set;

the indicated one TCI state set is mapped to one TCI state set from a set of a TCI state set;

the indicated one TCI state set is mapped to one TCI state set from different subsets of TCI state set;

the indicated one TCI state set is mapped to one TCI state set from different sets of TCI state set;

the indicated more TCI state sets are mapped to more TCI state sets from a subset of a TCI state set;

the indicated more TCI state sets are mapped to more TCI state sets from a set of a TCI state set;

the indicated more TCI state sets are mapped to more TCI state sets from different subsets of a TCI state set;

the indicated more TCI state sets are mapped to more TCI state sets from different sets of a TCI state set;

one of the indicated more TCI state sets is mapped to one TCI state set from a subset of TCI state sets;

one of the indicated more TCI state sets is mapped to one TCI state set from a set of TCI state sets;

each one of the indicated more TCI state sets is mapped to one TCI state set from a subset of TCI state sets;

each one of the indicated more TCI state sets is mapped to one TCI state set from a set of TCI state sets;

each one of the indicated more TCI state sets is mapped to one TCI state set from different subsets of a TCI state set;

each one of the indicated more TCI state sets is mapped to one TCI state set from different sets of a TCI state set.

9. The method of any of solutions 1-8, wherein a second signal activates or deactivates or updates or selects at least one of: one subset of TCI states; one set of TCI states; multiple subsets of TCI states; multiple sets of TCI states; one subset of TCI state sets, one set of TCI state sets, multiple sets of TCI state sets or multiple subsets of TCI state sets.

10. the method of solution 9, wherein:

one subset of TCI state is associated with or from a cell or a group of cells;

each TCI state or a part thereof from a subset of TCI states is associated with or from a cell or a group of cells;

each TCI state or a part thereof from a set of TCI states is associated with or from a cell or a group of cells;

different one or more TCI states from a subset of TCI state is associated with or from different cells or a different groups of cells;

different one or more TCI states from a set of TCI state is associated with or from different cells or a different groups of cells;

each subset of a TCI state is associated with or from a cell or a group of cells;

each set of a TCI state is associated with or from a cell or a group of cells;

different subsets of a TCI state are associated with or from a cell or a group of cells;

different sets of a TCI state are associated with or from a cell or a group of cells;

different subsets of a TCI state are associated with or from different cell or different group of cell;

different sets of a TCI state are associated with or from different cell or different group of cell;

one subset of the TCI state sets is associated with or from a cell or a group of cells;

one set of the TCI state sets is associated with or from a cell or a group of cells;

each TCI state set or a part thereof one subset of TCI state set is associated with or from a cell or a group of cells;
each TCI state set or a part thereof one set of TCI state set is associated with or from a cell or a group of cells;
different TCI state sets from one subset of a TCI state sets are associated with or from different cell or different group of cell;
different TCI state sets from one set of a TCI state sets are associated with or from different cell or different group of cell;
different TCI state sets from one subset of a TCI state sets are associated with or from a cell or a group of cells;
different TCI state sets from one set of a TCI state sets are associated with or from a cell or a group of cells;
different subsets of a TCI state set are associated with or from a cell or a group of cells;
different sets of a TCI state set are associated with or from a cell or a group of cells;
different subsets of a TCI state set are associated with or from different cells or different group of cells;
different sets of a TCI state set are associated with or from different cells or different group of cells;
a TCI state set is associated with or from a cell or a group of cells;
a TCI state set is associated with or from different cells or groups of cells;
different TCI state sets are associated with or from a cell or a group of cells; or different TCI state sets are associated with or from different cells or groups of cells.

11. The method of any of solutions 1-10, further including receiving a second signal, wherein the second signal activates or deactivate or updates or selects at least one of:
a subset of cells or cell groups from the configured one or more cell or cell group pools or sets;
a set of cells or cell groups;
a set of TCI states or TCI state sets;
multiple subsets of TCI states or TCI state sets;
a subset of TCI states or sets;
a set of measurement configurations;
multiple subsets of measurement configurations;
a subset of measurement configurations;
a set of reporting configurations;
multiple subsets of reporting configurations;
a subset of reporting configurations;
corresponding multiple subsets of TCI states or sets;
corresponding set of TCI states or sets;
corresponding subset of TCI states or sets;
corresponding set or subset of cells of cell groups;
corresponding measurement configuration;
corresponding reporting configuration;
corresponding subsets of measurement configurations;
corresponding set or subset of measurement configurations;
corresponding subsets of reporting configurations; or
corresponding set or subset of reporting configurations.

12. The method of solution 8, further at least one of the following can be activated or deactivated or updated or selected by the second signal:
a subset of cells or cell groups from the configured one or more cell or cell group pools or sets;
a set of cells or cell groups;
a set of TCI states or TCI state sets;
multiple subsets of TCI states or TCI state sets;
a subset of TCI states or sets;
a set of measurement configurations;
multiple subsets of measurement configurations;
a subset of measurement configurations;
a set of reporting configurations;
multiple subsets of reporting configurations;
a subset of reporting configurations;
corresponding multiple subsets of TCI states or sets;
corresponding set of TCI states or sets;
corresponding subset of TCI states or sets;
corresponding set or subset of cells of cell groups;
corresponding measurement configuration;
corresponding reporting configuration;
corresponding subsets of measurement configurations;
corresponding set or subset of measurement configurations;
corresponding subsets of reporting configurations; or
corresponding set or subset of reporting configurations.

13. The method of solution 11 or 12, wherein including one or more of the following:
one or more TCI states or TCI state sets from a set or subset of TCI states or TCI state sets are associated with or from a cell or cell group;
one or more TCI states or TCI state sets are associated with or from a cell or cell group;
one or more measurement configurations are associated with or from a cell or cell group;
one or more measurement configurations from a set or subset of measurement configurations are associated with or from a cell or cell group;
one or more reporting configurations are associated with or from a cell or cell group;
one or more reporting configurations from a set or subset of reporting configurations are associated with or from a cell or cell group;
a subset of TCI states or sets is associated with or from a cell or cell group;
a subset of measurement configurations is associated with or from a cell or cell group;
a subset of reporting configurations is associated with or from a cell or cell group;
a set of TCI states or sets is associated with or from a cell or cell group;
a set of measurement configurations is associated with or from a cell or cell group; or
a set of reporting configurations is associated with or from a cell or cell group.

14. The method of solution 11 or 12, wherein including one or more of the following:
different one or more TCI states or TCI state sets from a set or subset of TCI states or TCI state sets are associated with or from different multiple cells or cell groups;
different one or more TCI states or TCI state sets are associated with or from different cells or cell groups;
different measurement configurations are associated with or from different cells or cell groups;
different one or more measurement configurations from a set or subset of measurement configurations are associated with or from different cells or cell groups;
different reporting configurations are associated with or from different cells or cell groups;
different one or more reporting configurations from a set or subset of reporting configurations are associated with or from different cells or cell groups;
different subset of TCI states or TCI state sets are associated with or from different cells or cell groups;
different subset of measurement configurations are associated with or from different cells or cell groups;

different subset of reporting are associated with or from different cells or cell groups;

different set of TCI states or TCI state sets are associated with or from different cells or cell groups;

different set of measurement configurations are associated with or from different cells or cell groups;

different set of reporting are associated with or from different cells or cell groups.

15. The method of any of solutions 1-14, further including receiving a third signaling, wherein the third signaling configures at least one of:

one cell or cell group pool or set;

multiple cell or cell group pools or sets;

one set of measurement configuration;

multiple sets of measurement configuration;

one set of reporting configuration;

multiple sets of reporting configuration;

one TCI state pool or set;

multiple TCI state pools or sets.

16. The method of any of solutions 1-15, wherein the first signaling or the second signaling is received according to a fourth rule specifying that:

the wireless device does not expect to be indicated or activated or selected one or more TCI states or sets that associated with or from a cell or cell group; or, the wireless device expects to be indicated or activated or selected one or more TCI states or set that associated with or from a cell or cell group; or the wireless device does not expect to be indicated or activated or selected one or more TCI states or sets that are from a set or subset of TCI states or sets;

the wireless device does not expect to be indicated or activated or selected one or more TCI states or sets that are from more sets or subsets of TCI states or sets;

the wireless device expects to be indicated or activated or selected one or more TCI states or sets that are from a set or subset of TCI states or sets;

the wireless device expects to be indicated or activated or selected one or more TCI states or sets that are from more sets or subsets of TCI states or sets.

17. The method of any of solutions 1-16, wherein the first signaling or the second signaling is received according a rule specifying that:

the wireless device does not expect to be indicated or activated or selected one or more TCI states or sets in which RS is not associated with a cell or cell group; or the wireless device does not expect to be indicated or activated or selected one or more TCI states or set that is not associated with a cell or cell group; or the wireless device expects to be indicated or activated or selected one or more TCI states or set in which RS is associated with a cell or cell group; or the wireless device expects to be indicated or activated or selected one or more TCI states or set that is not associated with or from a cell or cell group.

18. The method of solution 16 or 17, wherein:

a cell or cell group is activated or configured or selected or candidate cell or target cell; or a cell or cell group is not activated or configured or selected or candidate cell or target cell; or a set or subset of TCI states or sets is activated or configured or selected or associated with or from activated or configured cell; or a set or subset of TCI states or sets is not activated or configured or selected or associated with or from activated or configured cell.

19. The method of any of solutions 1-18, wherein a cell or cell group comprises at least one of serving cell or a candidate cell.

20. The method of any of above solutions, wherein the first signaling or second signaling or third signaling can be at least one of downlink control information DCI signaling, medium access control MAC control element CE signaling, radio resource control RRC signaling.

21. The method of any of solutions 1-20, wherein at least one of following depends on a capability of the wireless device or determined by one of a downlink control information (DCI) signaling, a medium access control (MAC) signaling, a radio resource control (RRC) signaling, or is pre-defined, or determined by a wireless device capability signaling:

a maximum number of activated or selected or configured TCI states;

a maximum number of activated or selected or configured TCI states for a cell or cell group;

a maximum number of activated or selected or configured TCI states for a signaling;

a maximum number of activated or selected or configured TCI states for a TCI state pool or set;

a maximum number of activated or selected or configured TCI states for a serving cell or cell group;

a maximum number of activated or selected or configured TCI states for a candidate cell or cell group;

a maximum number of activated or selected or configured TCI states for all cells or cell groups;

a maximum number of TCI state pool or set;

a maximum number of activated or selected or configured TCI state pool or set;

a maximum number of cell or cell group;

The maximum number of activated or selected or configured cell or cell group;

a maximum number of candidate cells or cell groups;

a maximum number of activated or selected or configured candidate cell or cell group;

a maximum number of measurement reporting;

a maximum number of measurement;

a maximum number of measurement configuration;

a maximum number of activated or selected or configured measurement configuration;

a maximum number of reporting configuration; or a maximum number of activated or selected or configured reporting configuration.

22. The method of any of solutions 1-21, further includes receiving an additional TCI state or a TCI state set for a target cell.

23. The method of solution 22, wherein the additional TCI state or set is indicated or used for target cell when at least one of the following scenarios occurs:

the indicated one or more TCI state or set does not effective or cannot be applied;

a cell or a cell group corresponding to or associated with the indicated one or more TCI state or set is not triggered or changed or indicated by a signaling or does not effective or cannot be applied;

a related information for the cell or the cell group has not been prepared yet.

24. The method of solution 22, wherein an additional TCI state can be determined by at least one of:

using a TCI state from current serving cell;

a default TCI state rule;

a reserved ID;

a special field to indicate; or a special value/entry.

25. A wireless communication apparatus comprising a processor configured to implement a method recited in any of solutions 1-24.

26. A computer-readable medium having code stored thereupon, the code, upon execution by a processor, causing the processor to implement a method recited in any of solutions 1-24.

It will be appreciated by one of skill in the art that the present document discloses various enhancements to TCI state indication.

It will further be appreciated that various procedures of TCI state indication include a first signaling that configures one or more TCI state pool/set, or, one or more cell in a cell pool/set and/or the corresponding to TCI state pool/set. For the case that first signaling configures one or more TCI state pool/set, one TCI state pool/set is associated with a cell or cell group. For the case that first signaling configures one or more Cell in a cell pool/set, one TCI state pool/set is configured for or in a cell or cell group.

It will further be appreciated that the procedure may include a second signaling that activates in one or more ways: (1): a sub-set/pool of TCI state from each configured TCI pool/set, or from multiple configured TCI state pool/set is activated, (2) a sub-set of cell from the configured cell pool/set, and corresponding sub-set of TCI state is activated. Here, a sub-set of TCI state is from a cell or a sub-set of TCI state is from multiple cells.

It will further be appreciated that the procedure may include a third signaling that indicates one TCI state, or one cell and corresponding TCI state. Additional TCI state is defined or indicated or introduced to handle some special case.

The present document further disclosed techniques for how to distinguish Rel-17 inter-cell mobility without cell change and Rel-18 inter-cell mobility with cell change.

It will be appreciated that, although some techniques are described as "optional" or "alternatives" under a section heading, the techniques may also be used in combination with other techniques listed under different embodiments to achieve communication efficiency.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:

1. A method of wireless communication, comprising:

receiving, by a wireless device from a first network device, a first medium access control (MAC) control element (CE) signaling that is used to activate a subset of one or more transmission configuration indication (TCI) states from a set of one or more TCI states for a candidate cell or cell group, wherein the set of one or more TCI states is configured by radio resource control (RRC) signaling;

receiving, from the first network device, a second MAC CE signaling indicating one or more TCI states from one or more activated TCI states; and performing a communication between the wireless device and a second network device according to one or more indicated TCI states.

2. The method of claim 1, wherein the one or more TCI states is associated with or configured for one or more candidate cells or cell groups.

3. An apparatus for wireless communication, comprising: one or more processors configured to perform the method of claim 1.

4. A method of wireless communication, comprising:

transmitting, by a first network device to a wireless device, a first medium access control (MAC) control element (CE) signaling that is used to activate a subset of one or more transmission configuration indication (TCI) states from a set of one or more TCI states for a candidate cell or cell group, wherein the set of one or more TCI states is configured by radio resource control (RRC) signaling; and transmitting, to the wireless device, a second MAC CE signaling indicating one or more TCI states from one or more activated TCI states, wherein the wireless device is configured to perform a communication between the wireless device and a second network device according to one or more indicated TCI states.

5. The method of claim 4, wherein:

the one or more TCI states is associated with or configured for one or more candidate cells or cell groups.

6. An apparatus for wireless communication, comprising:

one or more processors configured to perform the method of claim 4.

7. The method of claim 1, wherein the one or more indicated TCI states are applied until an additional TCI state is indicated, defined, or determined.

8. The method of claim 4, wherein the one or more indicated TCI states are applied until an additional TCI state is indicated, defined, or determined.

* * * * *